3,703,546
PREPARATION OF 3-AMINO-2,5-DICHLOROBENZOIC ACID

Joseph Michael Faraday Leaper, Lansdale, and Harvey Peter John Raman, Philadelphia, Pa., assignors to Amchem Products, Inc., Ambler, Pa.
No Drawing. Filed Oct. 24, 1968, Ser. No. 770,393
Int. Cl. C07c 101/54
U.S. Cl. 260—518 A      3 Claims

ABSTRACT OF THE DISCLOSURE 3-amino-2,5-dichlorobenzoic acid is prepared in high yield by chlorinating benzoylchloride and esterifying the resulting mixture, separating the desired 2,5-dichloro isomer from the mixture by freeze crystallization, nitrating and isolating 3-nitro-2,5-dichlorobenzoic acid from the mixture of nitro isomers by acid hydrolysis and treating with a reducing agent.

BACKGROUND OF THE INVENTION

In the herbicide field a quite considerable number of halogenated benzoic acids, especially chlorinated benzoic acids, are well known for their selective yet highly effective action against a broad range of undesirable plants. Two of the most well known of these chlorinated benzoic acids are; 3-nitro-2,5-dichlorobenzoic acid and salts, esters, amines or other derivatives thereof and 3-amino-2,5-dichlorobenzoic acid and salts, esters, amines or other derivatives thereof. 3-amino-2,5-dichlorobenzoic acid is conveniently prepared by the reduction of 3-nitro-2,5-dichlorobenzoic acid.

For a considerable number of years 3-nitro-2,5-dichlorobenzoic acid—either for use as a herbicide or as a precursor to 3-amino-2,5-dichlorobenzoic acid—has been manufactured, in a two-stage process, from benzoyl chloride according to the process shown schematically in FIG. 1 below.

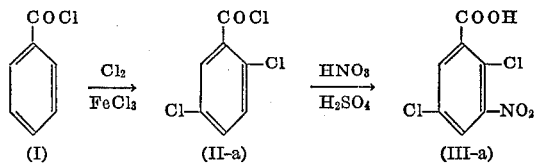

The preparative steps outlined in FIG. 1 involve the chlorination of benzoyl chloride (I), using chlorine in the presence of ferric chloride, followed by treatment with a nitrating agent to effect nitration and simultaneous hydrolysis of 2,5-dichloro benzoyl chloride (II-a) to give the desired 3-nitro-2,5-dichlorobenzoic acid (III-a).

This process looks comparatively simple. Unfortunately, however, even when conducted on a laboratory scale it is beset by problems which result in a poor yield of a very impure product. These problems of obtaining acceptable yields of pure product are magnified in large scale bulk manufacturing processes.

The chlorination reaction gives only about 70% by weight of the desired 2,5-dichloro compound (II-a); the remaining 30% is made up of various mono-, di- and trichloro isomers (about 15.2% 3,4-; 4.9% 2,3,5-; 4.2% 2,3; 1.9% 3- and 3.8% undetermined) which are of no use whatever. Indeed, in any manufacturing process it is obviously desirable that they should be removed before the nitration stage, to avoid the necessity of nitrating these undesirable byproducts and thereby also increasing the complexity of the nitration product. A partial separation of these unwanted compounds is obtained by vacuum fractional distillation, but even then the usable fraction contains as much as 20% by weight unwanted byproducts (about 3.3% 3,4-; 8.9% 2,3,5-; 5.3% 2,4-; 2.7% 3- and 0.2% 4-) which cannot be economically removed.

Utilizing this distillation product consisting of 80% by weight 2,5-dichloro isomer, only half is converted, by the nitration reaction, into the desired 3-nitro compound (III-a), the remainder being converted to the 6-nitro isomer. The separation of the 3-nitro product (III-a) from the unwanted 6-nitro isomer is a costly and laborious process, of low efficiency. Separation involves crystallizing the mixture of isomeric nitro compounds in caustic soda at a pH above 10; filtering off the crystals (which are mostly the unwanted 3,4-dichloro-6-nitrobenzoic acid) acidifying the filtrate to pH 2–4; filtering off a crystalline product which is mostly the 2,5-dichloro-3-nitro compound (III-a) but which still contains some of the other isomers from the starting mixture (about 10%).

The overall molar yield for the two stages is about 26% based on the 2,5-dichlorobenzoyl chloride starting material, and the final product still contains considerable amounts of the various unwanted compounds produced in each stage.

It will be apparent therefore that there are numerous difficulties associated with the process of the prior art, not the least of which is that it provides a low yield of an impure product.

It is an object of this invention to provide a novel process for the preparation of 3-nitro-2,5-dichlorobenzoic acid, which process provides a comparatively high yield of the desired product in a very pure state. It is equally an object of this invention to provide such a process which does not involve the laborious, costly and inefficient distillations, of the known processes. These, and other objects, will be apparent from the following disclosure.

BRIEF DESCRIPTION OF THE INVENTION

This invention concerns a novel process for the preparation of 3-nitro-2,5-dichlorobenzoic acid, and esters thereof. It relates particularly to such a process for the preparation of 3-nitro-2,5-dichlorobenzoic acid, which is the immediate precursor for 3-amino-2,5-dichlorobenzoic acid and which is a well known selective herbicide.

In its broad aspect this invention provides a process for the preparation of 3-nitro-2,5-dichlorobenzoic acid, in which 2,5-dichlorobenzoyl chloride is esterified to give an ester of 2,5-dichlorobenzoic acid which is readily separated from the reaction mixture and nitrated to give a mixture of the 3-nitro and 6-nitro isomers which are readily separated by acid hydrolysis to give the desired 3-nitro-2,5-dichlorobenzoic acid and the 6-nitro-2,5-dichlorobenzoic acid ester as substantially pure products.

In a more particular aspect this invention involves the discovery that, by preparing an ester of the intermediate 2,5-dichlorobenzoyl chloride, the remaining stages and separations in the synthetic process can be performed cleanly and easily, giving a product of high purity in high yield. Another particular aspect involves the discovery that the 3-nitro and 6-nitro isomers of esters of 2,5-dichlorobenzoic acid can be readily separated by acid hydrolysis.

DETAILED DESCRIPTION OF THE INVENTION

The various aspects of the novel process according to this invention can be traced with respect to the following schematic diagram wherein $n$ represents an integer from 1 to 5 and R represents the alcohol moiety of the ester formed by esterifying the corresponding acid or acid chloride with an alcohol. Any suitable monohydric carbinol can be utilized to form the ester. The alcohol moiety may be aliphatic or aromatic, preferably containing between 1 to 7 carbon atoms. Suitable alcohol groups are the alkyl or aralkyl groups and such groups in which one or more of the hydrogens have been replaced by a functional substituent such as halogen, dialkyl amino, etc. The term alkyl as used herein is intended to include a straight or branched chain (including cyclic) saturated hydrocarbon and particularly those containing one to seven carbon atoms, e.g. methyl, ethyl, propyl, isopropyl, butyl, sec-butyl, t-butyl, pentyl, hexyl, heptyl and the like. Methyl is especially preferred. The term aralkyl as used herein denotes an alkyl group as defined above in which one of the hydrogens has been replaced by phenyl or phenyl bearing one or more substituents. Preferred aralkyl groups are benzyl and phenethyl.

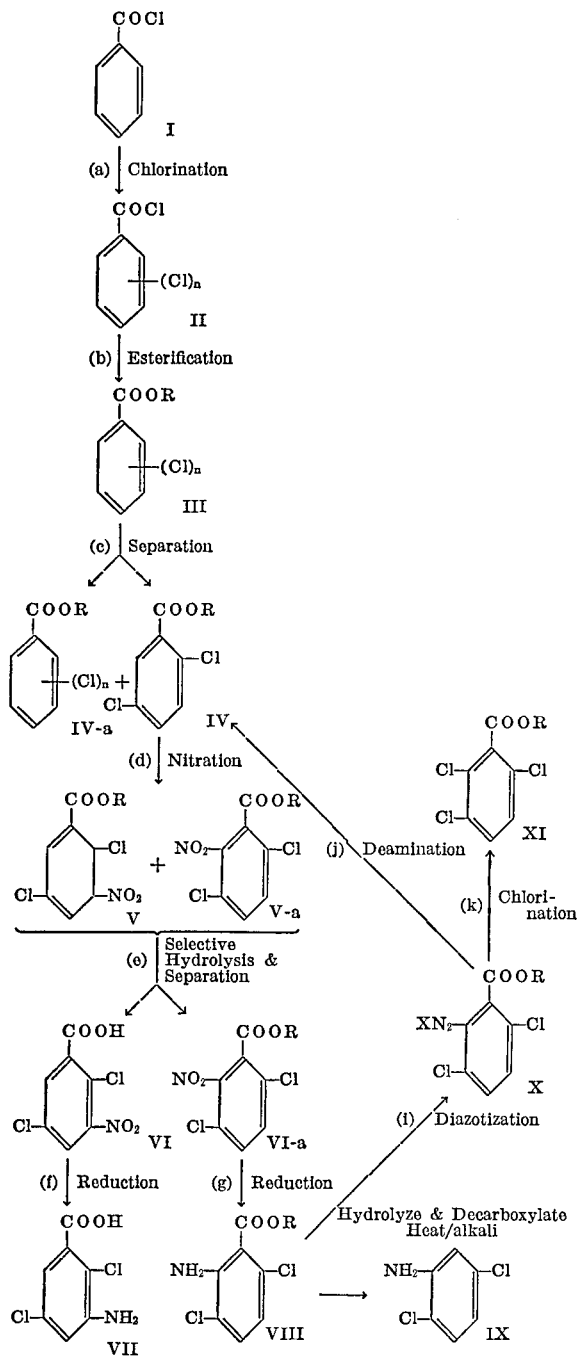

The novel process for preparing 3-amino-2,5-dichlorobenzoic acid can be traced with reference to the foregoing schematic diagram. The benzoyl chloride starting material is a known commercially available product. The chlorination of benzoyl chloride, step (a) to give a mixture of mono and poly chloro substituted benzoyl chlorides is per se well known in the art and can be readily accomplished by conventional chlorination procedures. For example, benzoyl chloride can be conveniently chlorinated by reacting with chlorine gas in the presence of ferric chloride to produce a mixture of compounds designed by Formula II of which about 70% by weight is the desired 2,5-dichlorobenzoyl chloride.

The mixture of chloro compounds of Formula II can be readily esterified by treating with an appropriate alcohol such as methanol, ethanol, propanol, butanol, cyclohexanol, and the like. The esterification reaction is preferably carried out in the presence of an acid acceptor. As acid acceptor there can suitably be employed any mild base, e.g. a base having a $K_b$ between about $10^{-5}$ and about $10^{-10}$ such as for example calcium carbonate, potassium carbonate, ammonium carbonate, sodium bicarbonate and the like. Weak organic bases can also be employed. The weak base employed in the reaction serves to neutralize the acid formed in the esterification and also to neutralize any acid remaining from the chlorination stage. The reaction proceeds at room temperature, though higher or lower temperatures can also be employed. The esterification is nearly quantitative giving an oily product which is readily separated from the reaction medium. Preferably the separation is completed by quenching with water and recovering the organic phase. The esterification product contains predominantly the desired 2,5-dichlorobenzoic acid ester which has been found according to the process of this invention to be readily isolated from the mixture. The 2,5-dichloro product can be separated by distillation or by a particularly facile method which has been found suitable for the esters though not for the acid chlorides. This method involves cooling the esterification product to below about 15° C. preferably to between about −10° C. and about 10° C. whereupon the desired 2,5-dichloro compound crystallizes from the mixture and is readily separated for example by centrifugation to give the desired product in greater than 99% purity. The methyl ester is obtained in especially high purity. Further advantages that accrue from the esterification are the ease of handling the ester as compared to the acid chloride and the obtention of a useful byproduct. The separated mixture of chlorobenzoic acid esters which consists primarily of the 2,3,6-trichloro and the 2,3-dichloro isomers are particularly in the case of the methyl ester known to be useful as herbicides.

The pure 2,5-dichlorobenzoic acid ester separated from the esterification product can be nitrated by the usual aromatic nitration techniques. Conveniently the nitration can be effected by treating the 2,5-dichlorobenzoic acid ester of Formula IV with a conventional nitration mixture consisting of fuming nitric acid and concentrated sulfuric acid (95%). Other nitrating agents e.g. fuming nitric, 70% nitric, various ratios of nitric and sulfuric, etc. can also be employed. The reaction is advantageously carried out at about room temperature or below though higher temperatures, e.g. up to 30 or 40° C. could also be employed. Preferably the reaction is carried out at a reduced temperature suitably at about −5° C. to about 5° C. The nitration reaction gives a mixture of 3-nitro-2,5-dichlorobenzoic acid ester and 6-nitro-2,5-dichlorobenzoic acid ester, namely the desired 3-nitro compound and the unwanted 6-nitro isomer. In theory, and in practice, at least half of the product is the desired 3-nitro compound; by adjusting the conditions, however, these two isomers can be produced roughly in the ratio of 60:40 3-nitro and 6-nitro. Even higher ratios of 3-nitro, e.g. 70% and greater can be obtained. The nitration step as disclosed herein can be carried out safely as a liquid phase reaction under the above conditions.

At this point it is interesting to note that, in the past, the nitration reaction has always been effected using, as the starting material, a reduced derivative of the benzoic acid, such as the aldehyde or acid chloride, these being assumed to be more reactive than the acid. According to the prior art literature—for example, Huntress, Organic Chlorine Compounds, p. 390 (1945), the nitration of the acid itself has never been reported and it is surprising, therefore, that the nitration of an ester is comparatively easy.

In the next step the esters of the 3-nitro and 6-nitro isomers are separated by acid hydrolysis. Here again it has been surprisingly found that when the mixture of isomers is treated with acid only the 3-nitro compound is hydrolyzed permitting nearly quantitative recovery of the desired 3-nitro-2,5-dichlorobenzoic acid. The hydrolysis can be conveniently carried out with a mineral acid, such as sulfuric acid. Other acids such as the carboxylic acids e.g. acetic, propionic, etc. or mixtures of acids can also be employed. The preferred hydrolyzing acid is aqueous 50% sulfuric acid or aqueous sulfuric acid together with acetic acid. The hydrolysis reaction is advantageously carried out by refluxing the reaction mixture though lower temperatures can also be employed. A suitable reaction temperature for the hydrolysis is between about 20° C. and about 150° C. The course of the reaction is readily followed by the formation of the insoluble acid in the reaction mixture.

The separation of the 3-nitro acid from the 6-nitro ester following hydrolysis may conveniently be effected by diluting the hydrolysis mixture with water, so that both the 3-nitro acid and the 6-nitro ester precipitate out of solution; the precipitate is filtered off and the residue is treated with base, preferably with a mild base, for example sodium bicarbonate, and the like, so as to solubilize the 3-nitro acid by converting it to a salt; and finally filtering off the undissolved 6-nitro ester and acidifying the filtrate to recover the 3-nitro acid. Alternatively, the separation may conveniently be effected by shaking the dry mixture of 3-nitro acid and 6-nitro ester with one of the common organic solvents, such as a halogenated alkane, particularly the chlorinated alkanes, and especially chlorinated alkanes of 1–4 carbon atoms, e.g. ethylene dichloride, methylene chloride, carbon tetrachloride and the like, in which the ester is soluble but the acid is substantially insoluble; and then decanting off the organic solution to give pure 3-nitro acid. The free 3-nitro acid is recovered in a high degree of purity and free of contamination by the 6-nitro ester. The 6-nitro ester (the residue before acidification or as dissolved in the organic solvent) is also recovered in a highly pure state.

Conversion of the 3-nitro-2,5-dichlorobenzoic acid to the herbicidally useful 3-amino-2,5-dichlorobenzoic acid is readily accomplished by reduction techniques well known to the art, for example by the Bechamp method. The amiben product can be obtained according to this process better than 98% pure in better than 35% overall yield based on the starting benzoyl chloride.

The 6-nitro-2,5-dichlorobenzoic acid ester obtained as a by-product can be further transformed into commercially useful by-products. It can be readily reduced to the corresponding 6-amino-2,5-dichlorobenzoic acid ester by conventional reduction methods analogous to those employed in the case of the 3-nitro-2,5-dichlorobenzoic acid. The amino derivative can be easily hydrolyzed and decarboxylated by simply heating in alkaline solution, preferably to a temperature of about the reflux temperature of the reaction mixture though higher or lower temperatures, suitably between about 50° C. and about 120° C., can also be employed. The decarboxylated product is 2,5-dichloroaniline, a stable article of commerce. Alternatively, the 6-amino-2,5-dichlorobenzoic acid ester of Formula VIII can be diazotized by conventional methods to form an intermediate of Formula X which can in turn be reduced for example by treatment with ethanol. The deaminated product can be recycled into the process for nitration and preparation of 3-amino-2,5-dichlorobenzoic acid. Alternatively, the diazo intermediate of Formula X can be subjected to a conventional Sandmeyer type replacement reaction to form the corresponding 2,3,6-trichlorobenzoic ester which is readily hydrolyzed to the acid. There is thus also provided a method for the preparation of substantially pure (greater than 98%) 2,3,6-trichlorobenzoic acid which is also useful as herbicides.

Alternatively the 6-nitro ester separated from the reaction product can by hydrolyzed to the corresponding acid at any stage in the preparation of either the 2,5,6-trichlorobenzoic acid or the 2,5-dichloro-aniline.

EXAMPLE 1

Methylation of the technical chlorinated benzoyl chloride (containing 70% of the 2,5-dichloro isomer)

130 grams (1.3 mol) of powdered calcium carbonate and 1000 cc. of 99% methanol are agitated at room temperature and 530 grams of technical 2,5-dichloro benzoyl chloride (70%) (1.78 mol of 2,5) are added at such a rate as to not exceed a temperature of 50° C. Stirring is continued for 2 hours after all dichloro benzoyl chloride has been added. 2 liters of water are added and enough HCl to dissolve excess CaCO$_3$ and the mixture is allowed to stand whereupon it separates into two layers.

The lower layer is drawn off and washed twice with warm water, separating after each wash. The product weighed 511 grams and had a density of 1.372 at 23° C. Its composition was as follows (by gas chromatograph):

|  | Percent |
|---|---|
| Methyl ester of 3-chlorobenzoic acid | 1.90 |
| Methyl ester of 2,3-dichloro benzoic acid | 4.20 |
| Methyl ester of 2,5-dichloro benzoic acid | 70.00 |
| Methyl ester of 3,4-dichloro benzoic acid | 15.20 |
| Methyl ester of 2,3,5-trichloro benzoic acid | 4.90 |
| Undetermined benzoic acid | 3.80 |

This mixture was distilled through a Vigreux column with a pressure of 1.5 to 3 mm. until 75% had distilled over. The residue containing all the trichloro methyl benzoate and part of the isomeric dichloro methyl benzoate is rejected. The yield of product containing 84% of 2,5 isomer was 383 grams (1.59 mol of 2,5). This product was allowed to stand overnight at a temperature of −16° C. The resulting solid mass was broken up and centrifuged until no further "drip oil" emerged. The product obtained was the pure methyl ester of 2,5-dichloro benzoic acid of M.P. 38–39° C. It weighed 284 grams (1.39 mol). The yield based on the amount of 2,5 isomer in the technical dichloro benzoyl chloride starting material is 80%.

EXAMPLE 2

Nitration of pure 2,5-dichloro methyl benzoate and hydrolysis of the nitration product An acid solution of 2,5-dichloro methyl benzoate (A) was prepared by mixing 246 grams (120 mol) of pure 2,5-dichloro methyl benzoate (M.P. 38–39) and 534 cc. of sulfuric acid (95%), 240 cc. of a nitrating mixture (B) was separately prepared by mixing 240 cc. nitric acid (90%) and 198 cc. of sulfuric acid (100%). Mixture B was gradually added to mixture A with stirring while keeping the temperature between 0° C. and −5° C. over a period of 2 hours. Stirring was continued at the same temperature for an additional 2 hours. The so-formed product, which was still liquid, was poured onto 4 liters of ice and stirred well. After ½ hour it was filtered, washed well on a Buchner funnel and sucked dry to yield 300 grams (1.20 mol) on dry weight basis. This product, consisting essentially of the mixed esters of 3-nitro and 6-nitro 2,5-dichlorobenzoic acid was hydrolyzed by adding thereto the following: 642 grams of sulfuric acid 95%, 220 grams of water, and 430 grams of acetic acid. This mixture was refluxed at 133° C. for 1½ hours with agitation. The resulting product was poured into 3 liters of cold water and the crystalline mixture filtered off and washed. The crystalline product consisted of a mixture of 3-nitro 2,5-dichlorbenzoic acid and the methyl ester of 6-nitro- 2,5-dichlorobenzoic acid. This mixture was stirred with 3 liters of a 5% solution of NaHCO₃ until all the 3-nitro acid was dissolved. It was then filtered, the filtrate precipitated with hydrochloric acid and the 3-nitro acid recovered in the usual way. The 6-nitro-2,5-dichloro methyl benzoate which is insoluble in the NaHCO₃ solution was recovered from the residue. The yields obtained were:

3 - nitro-2,5-dichlorobenzoic acid—150 grams M.P. 217–218 (.635 mol)

6 - nitro-2,5-dichloromethyl benzoate—120 grams M.P. 57–71 (.480 mol)

In an alternate procedure the dried nitration product was washed with a suitable solvent (ethylene dichloride) dissolving out the 6-nitro ester and leaving behind the 3-nitro acid. The yields were the same as with the NaHCO₃ separation as described above.

The overall yield of 2,5-dichloro-3-nitrobenzoic acid from the original technical 70% dichloro benzoyl chloride was as follows:

| | Percent |
|---|---|
| Methylation distillation and freeze separation | 78.2 |
| Nitration and hydrolysis | 52.8 | or from original technical chlorinated benzoyl chloride the yield is 41.5% (molar) 2,5-dichloro-3-nitro benzoic acid, technically pure and 31.3% (molar) 2,5-dichloro-6-nitro methyl benzoate; M.P. 38–39° C.; Density at 23° C., Solid; Ref. Index 23° C., 1.5525 (super fused).

EXAMPLE 3

Hydrolysis 200 grams of the moist nitration mixture (containing 50% moisture) obtained according to the nitration procedure of Example 2 above was combined with 160 grams glacial acetic acid and 250 grams of sulfuric acid (95%). The mixture was refluxed (temperature about 133° C.) for 90 minutes, poured into 1000 cc. water, stirred well, filtered, washed and then stirred with 1000 cc. of a 5% solution of NaHCO₃ until all the 3-nitro-2,5-dichlorobenzoic acid was dissolved. This solution was then filtered at room temperature leaving the unhydrolyzed methyl ester of 6 - nitro-2,5-dichlorobenzoic acid on the filter. When washed and dried the 6-nitro product weighed 40 grams and when recrystallized from Hexane had M.P. of 70–71° C. The filtrate containing the sodium salt of the 3-nitro isomer was treated with hydrochloric acid and the precipitated acid filtered off and dried to give 50 grams of 3-nitro-2,5-dichlorobenzoic acid of M.P. 217–218° C. in 90+% yield.

EXAMPLE 4

Separation of nitro isomers

The hydrolyzed product obtained as in Example 3 above was dried and treated with 500 cc. ethylene dichloride, stirred well and the mixture filtered. The insoluble 2,5-dichloro-3-nitro benzoic acid remaining weighed 50 grams and had M.P. 217–218° C. The filtrate from the ethylene chloride was evaporated to dryness and 40 grams of the methyl ester of 6-nitro-2,5-dichlorobenzoic acid were obtained, which after recrystallization from hexane had M.P. 70–71° C. A portion of this was hydrolyzed with NaOH as usual and gave the corresponding 6-nitro-2,5-dichlorobenzoic acid of M.P. 143–144.

EXAMPLE 5

Esterification 530 grams of a chlorinated product having the composition as follows:

| | Percent |
|---|---|
| 3-chloro benzoyl chloride | 1.90 |
| 2,3-dichloro benzoyl chloride | 4.20 |
| 2,5-dichloro benzoyl chloride | 70.00 |
| 3,4-dichloro benzoyl chloride | 15.20 |
| 2,3,5-trichloro benzoyl chloride | 4.90 |
| Undetermined | 3.80 | were gradually added with agitation to a mixture of 100 cc. of methanol and 130 grams of powdered calcium carbonate without cooling during 1½ hours. Stirring was continued for 2½ hours more and any slight turbidity due to excess of CaCO₃ was removed by adding a small amount of HCl. 2 liters of warm water were then added with stirring and the liquid was allowed to stand until separated. The lower layer containing mainly the 2,5-dichloromethyl benzoate with a little methanol was washed with a liter of water and again separated. The product contained no more than a trace of 2,5-dichloro acid, the rest being the mixed methyl esters. The product was then cooled to −10° C. overnight when it solidified to a cake. The cake was broken up and centrifuged until no more "drip oil" emerged. The "drip oil" was distilled under 1½ to 3 mm. pressure until about 10% remained in the still. The distillate boiling at 92–94° C. at 1½ to 3 mm. pressure was then subjected to the same freezing procedure as before and a further quantity of pure 2,5-dichloromethyl benzoate was obtained. The total amount of the ester obtained was 287 grams melting at 38–39° C. The drip oil remaining was 216 grams still containing 84 grams of 2,5-dichloromethyl benzoate so that 77% of the original content had been obtained in the form of a pure crystalline material of M.P. 38–39° C. This material was suitable for direct nitration.

EXAMPLE 6

Nitration 82 grams of 2,5-dichloromethyl benzoate M.P. 38–39° C. was dissolved in 328 grams of sulfuric acid (95%) poured into a 500 cc. flask and cooled to a temperature between −5° C. and 0° C. There was then slowly added a nitration mixture consisting of 120 grams nitric acid (90%) and 120 grams sulfuric acid (100%) which had been previously cooled. The temperature was maintained between −5° C. and 0° C. during the addition. The mixture remained quite fluid throughout. After all of the nitration mixture was added stirring was continued at the same temperature for 3 hours longer. The reaction mixture was then poured onto ice while agitating. The product, which remained quite crystalline, was filtered from the diluted mineral acid and washed well. It was then treated with a cold solution of sodium bicarbonate and the small amount of residual 3-nitro-2,5-dichlorobenzoic acid was thus separated and precipitated out from the filtered solution with HCl and recovered.

The insoluble portion consisting only of a mixture of 3- and 6-nitro-methyl benzoates weighed 88 grams or approximately 88% of theory. Separation of the isomers was carried out as described in Example 4 above.

EXAMPLE 7

Decarboxylation

Into a 100 ml. 1 neck flask with reflux condenser was placed 10 grams (.046 mols) of 6-amino-2,5-dichlorobenzoic acid methyl ester and 50 ml. of a 1:1 solution of concentrated HCl and H₂O. The mixture was refluxed 3 hours after which time the mixture was cooled and a steam distillation was set up and the aniline was steam distilled. The distillate was extracted with portions of ether. The ether layer was washed with dilute bicarbonate solution, then H₂O. The ether layer was then dried with drierite, filtered and the ether was evaporated. The crude product was recrystallized from 3A alcohol and Skelly B giving 7 grams of 2,5-dichloro aniline or needles; M.P. 50–52° C. (yield, 94%).

What is claimed is:

1. A process for the preparation of substantially pure esters of 2,5-dichlorobenzoic acid which comprises treating a mixture of mono- and polychlorinated benzoyl chlorides with methanol and separating substantially pure methyl ester of 2,5-dichlorobenzoic acid from the resulting mixture by means of low temperature crystallization by cooling the mixture to between about −10° C. and about 10° C. and separating the crystalline 2,5-dichlorobenzoic acid methyl ester; thereafter treating the so obtained methyl ester of 2,5-dichlorobenzoic acid with a nitrating agent to form a product mixture containing the methyl ester of 3-nitro-2,5-dichlorobenzoic acid and the methyl ester of 6-nitro-2,5-dichlorobenzoic acid and recovering 3-nitro-2,5-dichlorobenzoic acid from the mixture by treating with a carboxylic acid or a mineral acid to selectively hydrolyze the 3-nitro isomer and treating said 3-nitro isomer with a reducing agent to form 3-amino-2,5-dichlorobenzoic acid.

2. The process according to claim 1 wherein the acid is sulfuric acid.

3. The process according to claim 1 wherein the acid is a mixture of sulfuric and acetic acid.

References Cited

UNITED STATES PATENTS 3,014,063  12/1961  McLane et al. _____ 260—471 R

OTHER REFERENCES

Vogel, A. I., Practical Organic Chemistry (1962) 3rd edition, pub. by John Wiley and Sons, Inc., New York, N.Y.

LORRAINE A. WEINBERGER, Primary Examiner

L. A. THAXTON, Assistant Examiner

U.S. Cl. X.R.

260—471 R, 515 A